UNITED STATES PATENT OFFICE.

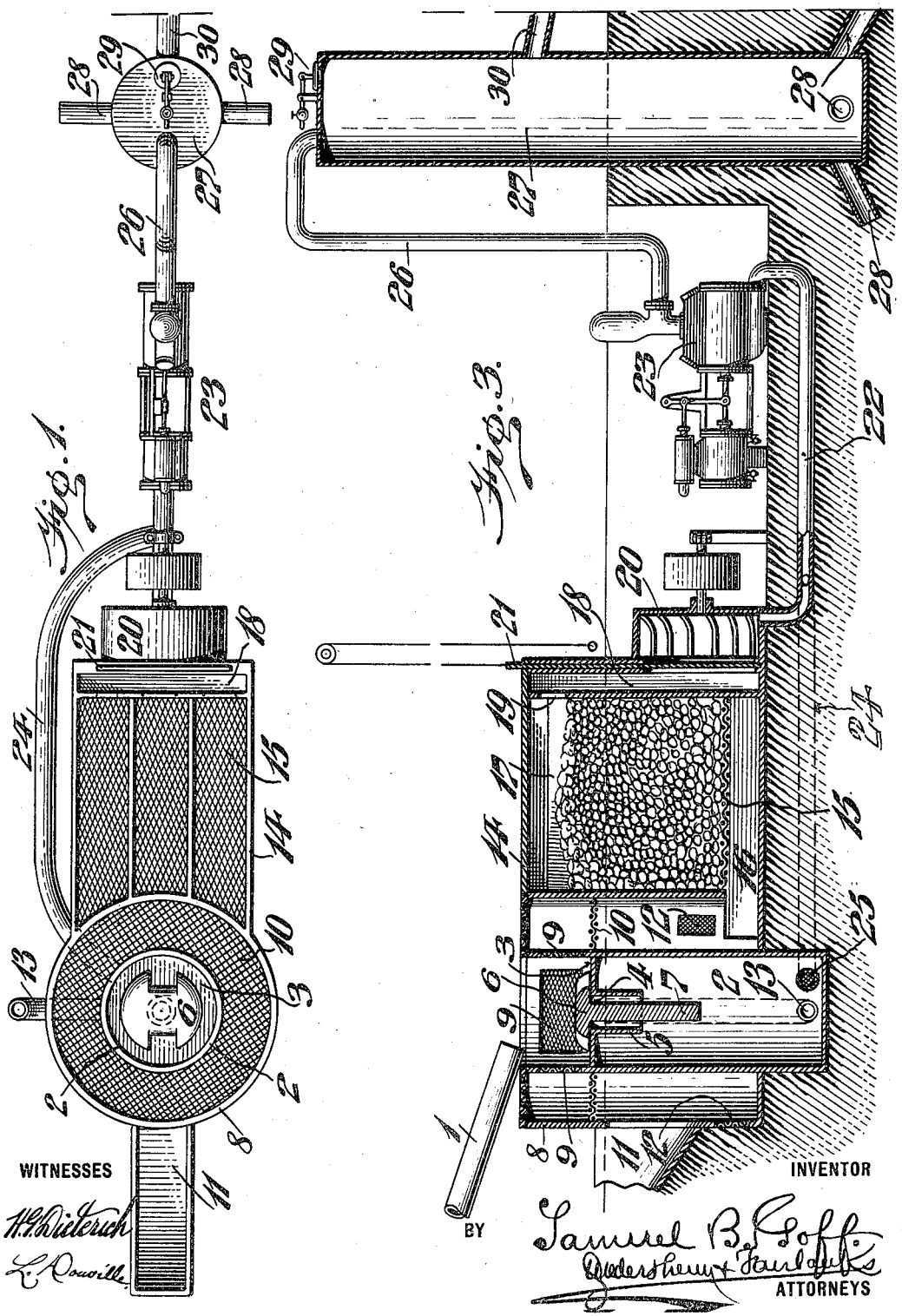

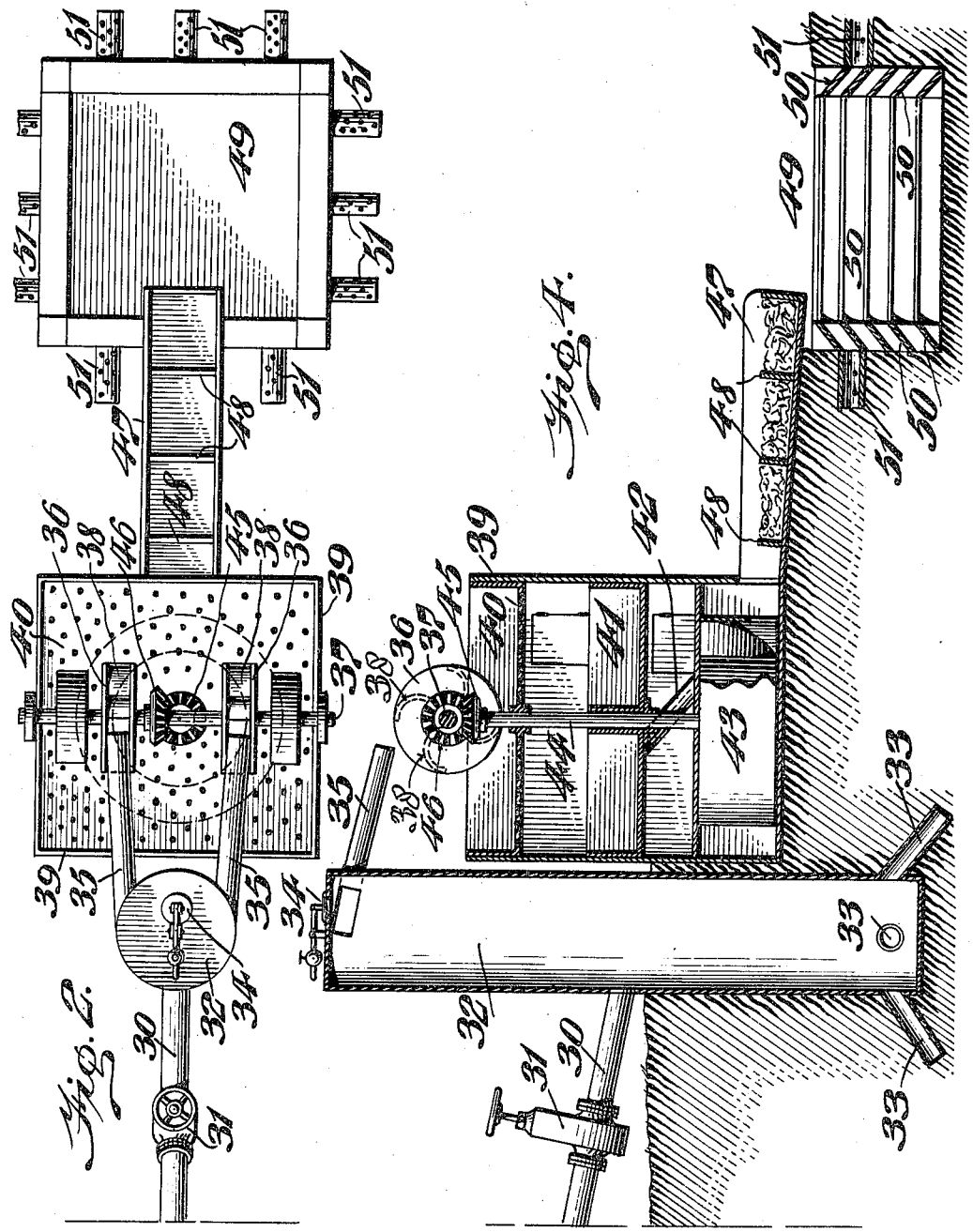

SAMUEL B. GOFF, OF CAMDEN, NEW JERSEY.

SEWAGE-DISPOSAL PLANT.

1,046,172.  Specification of Letters Patent.  Patented Dec. 3, 1912.

Application filed September 2, 1911. Serial No. 647,426.

*To all whom it may concern:*

Be it known that I, SAMUEL B. GOFF, a citizen of the United States, residing in the city of Camden, county of Camden, and State of New Jersey, have invented a new and useful Sewage-Disposal Plant, of which the following is a specification.

My invention consists of a sewage disposal plant in which the solid and liquid constituents of the sewage are separated and the liquid employed for generating power.

It further consists of such a plant in which the liquid sewage is successively strained and aerated before final disposal.

It further consists of such a plant in which the liquid sewage is aerated while generating power.

It further consists of other novel features of construction, all as will be hereinafter fully set forth.

The invention is satisfactorily illustrated in the accompanying drawing, but the important instrumentalities thereof may be varied, and so it is to be understood that the invention is not limited to the specific arrangement and organization shown and described.

Figure 1 represents a plan view of one part of my improved sewage disposal plant. Fig. 2 represents a plan view of the remainder of the plant. Fig. 3 represents a longitudinal vertical section of the part illustrated in Fig. 1. Fig. 4 represents a longitudinal vertical section of the part illustrated in Fig. 2.

Similar numerals of reference indicate corresponding parts in the figures.

Referring to the drawings:—the numeral 1 indicates the end of a sewer pipe forming the terminal of a system for conveying sewage to the disposal plant. Said pipe discharges into a settling tank 2, having a horizontal partition, 3, having a central opening 4, from the edge of which depends a pipe 5. A buoyant float valve 6, is seated to cover the opening, and has a guide-stem 7, projecting down into the pipe but leaving a space around it. A casing 8, surrounds the settling tank to form an annular receptacle around the same, and the settling tank has screened openings 9, in its sides, above the horizontal partition into the upper end of the annular receptacle, which has an annular screen 10, at the level of the partition. An inclined chute 11, enters one side of the annular receptacle from the surface of the ground, so that grease or scum collecting upon the surface of the liquid contents of said receptacle may be removed as such grease or scum accumulates. The annular receptacle has screened openings 12, in its sides, near the bottom, through which part of the liquid contents may drain into the surrounding soil. An inclined tube 13, extends from the surface of the ground to the bottom of the settling tank, through which tube the solid, or rather semi-solid, contents of said tank may be removed by pumping or other means. A casing 14, is provided at one side of the casing 8 surrounding the settling tank, and said casing has a screen 15, supported a distance above its bottom, forming an inlet-chamber 16, communicating with the lower end of the annular liquid receptacle. A deep layer of gravel 17, or similar coarse straining or screening material, is supported upon the screen 15, and a vertical flume 18 is formed at the end of the strainer formed by the casing 14, the screen and the gravel-layer, and communicates with the same through an opening 19, at its upper end. The flume opens at its lower portion into the casing of a turbine 20, such opening being controlled by a gate 21. The discharge from said turbine opens into a tail-flume 22 connected to the cylinder of a power-driven pump 23. A pipe 24, extends from a screened opening 25 in the lower end of the settling-tank, to said tail-flume. The pump discharges through a pipe 26, into the upper end of a stand-pipe 27, having its lower portion beneath the surface of the ground, and pipes 28, extend downwardly inclined from the lower end of said stand-pipe into the surrounding soil, through which a portion of the liquid contents of the stand-pipe may drain into the surrounding soil. A blow-off valve 29, is provided in the top of the stand-pipe to provide escape for air accumulating in the same as the liquid contents rise in the same. A pipe 30, having a gate 31 extends from near and above the middle of the stand-pipe, and opens into another stand-pipe 32, at about the middle of the same. Said stand-pipe has drain-pipes 33, at its lower end, similar to those of the first stand-pipe, and a blow-off valve 34. Chutes or flumes 35, extend from the upper end of this second stand-pipe, and discharge upon overshot water-wheels 36, upon a horizontal shaft 37, and having curved buckets 38, insuring powerful impact of the liquid and agitation and consequent aeration of the same. The shaft of the water-wheels is journaled above and transverse to a tank 39, into which said wheels discharge. The bottom 40, of said tank is perforated and the contents of the tank, dropping through the perforated bottom are aerated and oxidated and received in a tank 41, below. Said tank has a flume 42 in its bottom, leading to a turbine 43, upon a vertical shaft 44, journaled through the centers of the tank. This shaft has a bevel-gear 45, which meshes with a bevel-gear 46, upon the horizontal shaft of the water-wheels, so that the latter and the turbine rotate together. The tail-water of the turbine passes through a flume 47 having transverse partitions 48, and partly filled with chlorid of lime or similar disinfecting agent. This flume discharges into a sump 49, the sides of which are formed from outwardly inclined and spaced plates or slats 50. These inclined slats direct the liquid downward into the soil and prevent the soil from dropping into the sump. Perforated tiles 51, are placed at the sides of the sump and in the soil, near the top of the sump, to facilitate the carrying away of the liquid in the latter into the soil.

As the sewage is discharged from the sewer into the settling-tank, the liquid contents will pass through the screens into the annular liquid receptacle. As the upper portion of the settling-tank becomes filled and the liquid contents cannot escape as freely as they enter, such liquid accumulates and the float valve will rise on account of its buoyancy and uncover the central opening in the horizontal partition, and the semi-liquid contents will drop into the bottom of the settling-tank. Part of the liquid sewage in the annular receptacle may drain out through the screened openings near the bottom and into the surrounding soil. Whatever of the liquid sewage that has not drained out of the annular receptacle passes from the bottom of the same and up through the straining gravel bed which will catch any solids which have not been strained by the several screens or have not settled by gravity in the settling tank. The liquid now passes through the vertical flue and drives the turbine, whence it flows to the pump and is there lifted to the top of the first stand-pipe. The turbine may be suitably connected to assist in driving the pump or the power generated by the turbine may be otherwise utilized. The part of the liquid which has not drained out at the bottom of the stand-pipe flows, when reaching a level above its discharge-pipe into the second stand-pipe, and when the liquid in the latter rises to the top of the same, the liquid flows out to drive the water-wheels, being agitated and aerated thereby and, consequently, purified. The liquid dropping through the perforated bottom of the tank is further aerated and purified whereupon it drives the second turbine. The power derived from the water-wheels and the turbine may be utilized for any suitable purpose as, for instance, it may be suitably applied to assist in operating the power pump. The liquid is now finally purified and disinfected by passing over the chlorid of lime or other disinfectant in the partitioned flume and is finally discharged into the sump whence it drains into the surrounding soil. As already stated, the semi-solid part of the sewage deposited in the settling tank may be removed from the same through the inclined tube. Any liquid collecting in the bottom of the settling tank may be drawn off through the screened opening 25 and pipe 24 and conveyed by the pump to the first stand-pipe.

If the plant can be constructed upon an incline, the liquid constituents of the sewage will acquire a correspondent head, creating proportionally increased power in the turbines and water-wheels and requiring proportionally less additional power for the pump.

While the several water-power devices may generate power if a sufficient head exists, such power generation is not particularly relied upon, but the devices agitate and aerate the liquid, thereby purifying the same. The several successive tanks, opening into the surrounding soil, distribute the liquid over a considerable area and thus avoid contamination of soil at one place or of water-courses, as would be liable to happen if the liquid were disposed of at one spot.

Having thus described my invention what I claim as new and desire to secure by Letters Patent, is:—

1. In a sewage disposal plant, a settling tank having a horizontal partition formed with an opening and having strainer openings in its sides above said partition, a liquid receptacle surrounding said tank, and a buoyant float-valve for the opening in the partition to control the same.

2. In a sewage disposal plant, a settling tank having a horizontal partition formed with an opening having a depending pipe, and said tank also having strainer openings in its sides above the partition, a liquid receptacle surrounding said tank and having a strainer at about a level with said partition and also having strainer openings near its bottom, and a buoyant float-valve for the opening in the partition to control the same and formed with a pending stem playing in the depending pipe.

3. In a sewage disposal plant, a settling tank having strainer openings in its upper portion and means for collecting the solid sewage, a liquid receptacle surrounding said tank to receive the liquid sewage from the strainer-openings in the tank, a casing having a screen above its bottom supporting a bed of straining material and having the space below such screen communicating with the liquid receptacle, a vertical flume having its upper end communicating with the interior of said casing above the straining material, and means for agitating and aerating the liquid discharging from said flume.

SAMUEL B. GOFF.

Witnesses:
 JOHN A. WIEDERSHEIM,
 WM. SECHER.